United States Patent [19]

Kanda et al.

[11] Patent Number: 5,185,393
[45] Date of Patent: Feb. 9, 1993

[54] WATER-IN-OIL EMULSION OF CATIONIC POLYMER

[75] Inventors: Shoichi Kanda; Takeshi Narita; Masahiro Ushigome; Masaharu Nagahama, all of Kanagawa, Japan

[73] Assignee: Nitto Chemical Industry Co., Ltd., Tokyo, Japan

[21] Appl. No.: 635,026

[22] Filed: Dec. 28, 1990

[30] Foreign Application Priority Data

Dec. 28, 1989 [JP] Japan .................. 1-338333

[51] Int. Cl.⁵ .............................................. C08K 5/52
[52] U.S. Cl. .................................. 524/140; 524/145; 524/801
[58] Field of Search ............ 524/140, 801, 145, 487, 524/577

[56] References Cited

U.S. PATENT DOCUMENTS 4,460,568 7/1984 Strasilla .............................. 526/258

Primary Examiner—Joseph L. Schofer
Assistant Examiner—Jeffrey T. Smith
Attorney, Agent, or Firm—Sughrue, Mion, Zinn, Macpeak & Seas

[57] ABSTRACT

A water-in-oil emulsion of a cationic polymer suitable for inversion, comprising a continuous phase comprising a hydrophobic liquid, a discontinuous phase comprising a water-soluble cationic polymer, and a surface active agent system for inventing the emulsion in water, the system comprising a mixture of at least one alkyl phosphate represented by formula (I) or (II) and at least one other surface active agent compatible with the at least one alkyl phosphate:

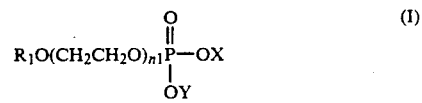

(I)

wherein $R_1$ represents a saturated or unsaturated hydrocarbon group having from 8 to 18 carbon atoms; X and Y, which may be the same or different, each represents a hydrogen atom, an alkali metal, an ammonium group, or an alkanolamino group; and $n1$ represents 0 or an integer of from 1 to 4;

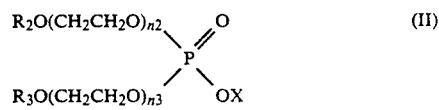

(II)

wherein $R_2$ and $R_3$, which may be the same or different, each represents a saturated or unsaturated hydrocarbon group having from 8 to 18 carbon atoms; X represents a hydrogen atom, an alkali metal, an ammonium group, or an alkanolamino group; and $n2$ and $n3$ each represents 0 or an integer of from 1 to 4.

19 Claims, No Drawings

WATER-IN-OIL EMULSION OF CATIONIC POLYMER

FIELD OF THE INVENTION

This invention relates to a water-in-oil emulsion (W/O emulsion) and, more particularly to a W/O emulsion of a water-soluble cationic polymer containing a novel surface active agent system for inversion, which is rapidly inverted in water.

BACKGROUND OF THE INVENTION

Water-soluble cationic polymers, such as copolymers of acrylamide and a cationic monomer, e.g., dimethylaminoethyl methacrylate, diethylaminoethyl methacrylate, or a quaternary salt thereof, are very useful as high molecular weight polymer flocculating agents, high molecular weight polymer dehydrating agents, paper manufacturing chemicals, etc.

A W/O emulsion and a process for producing the same are disclosed in JP-B-34-10644 (the term "JP-B" as used herein means an "examined published Japanese patent application") by Banderhoff, et al. However, since the disclosed emulsion is not stable in practice, it has been required for economical use that the water-soluble polymer should be separated from the emulsion by sedimentation and recovered as a solid.

Some of the defects of the emulsion of Banderhoff, et al. were overcome by U.S. Pat. No. 3,624,019 to Anderson et al., in which a polymer does not need to be isolated as a solid. The emulsion of the Anderson patent contains a surface active agent whereby the emulsion will be inverted to an aqueous polymer solution on addition to water. Although the W/O emulsion of Anderson et al. brought about an advance in the conventional process for production and the method of use, the capability of inversion of the surface active agent used in the emulsion is still insufficient because a long time is required for inversion and/or a large addition of the surface active agent is required to accomplish inversion within a predetermined time.

SUMMARY OF THE INVENTION

An object of the present invention is to solve the problems associated with the above-described conventional techniques and to provide a W/O emulsion which is stable during production or preservation with time and is rapidly inverted in an aqueous medium.

The inventors have conducted extensive and intensive investigations to achieve above objective among others. As a result, it has now been found that a specific surface active agent system is extremely effective for inversion of a W/O emulsion containing a cationic polymer aqueous solution as a discontinuous phase in water.

The above and other objectives and advantages are obtained by the present invention which relates to a W/O emulsion of a cationic polymer suitable for inversion, comprising a continuous phase comprising a hydrophobic liquid, and a discontinuous phase comprising a water-soluble cationic polymer, and a surface active agent system for inverting said emulsion in water, said system comprising a mixture of at least one alkyl phosphate represented by formula (I) or (II) and at least one other surface active agent compatible with the alkyl phosphate:

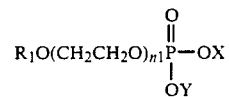

wherein $R_1$ represents a saturated or unsaturated hydrocarbon group having from 8 to 18 carbon atoms; X and Y, which may be the same or different, each represents a hydrogen atom, an alkali metal, an ammonium group, or an alkanolamino group; and $n_1$ represents 0 or an integer of from 1 to 4;

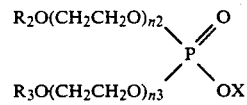

wherein $R_2$ and $R_3$, which may be the same or different, each represents a saturated or unsaturated hydrocarbon group having from 8 to 18 carbon atoms; X represents a hydrogen atom, an alkali metal, an ammonium group, or an alkanolamino group; and $n_2$ and $n_3$ each represents 0 or an integer of from 1 to 4.

Unexpectedly, the surface active agent system for inversion according to the present invention is effective only in emulsions in which a water-soluble polymer is cationic but ineffective in those in which a water-soluble polymer is nonionic or anionic.

DETAILED DESCRIPTION OF THE INVENTION

Water-soluble cationic polymers which can be used in the present invention include homopolymers of cationic monomers, such as dimethylaminoethyl (meth)acrylate, diethylaminoethyl (meth)acrylate, dimethylaminopropyl (meth)acrylate, dimethylaminohydroxypropyl (meth)acrylate, and dimethylaminoethyl acrylamide as well as quaternary ammonium salts thereof, and vinylpyridine; and copolymers of these cationic monomers and acrylamide or other vinyl monomers. These cationic polymers are not limited in molecular weight. In general, water-soluble cationic polymers having a molecular weight above several tens of thousands up to about 20,000,000 are preferably used.

Hydrophobic liquids comprising the continuous phase which can be used in the present invention include liquid hydrocarbons and substituted liquid hydrocarbons. Examples of suitable hydrophobic liquids are halogenated hydrocarbons, e.g., perchloroethylene, and aromatic or aliphatic hydrocarbons, e.g., dodecane, tetradecane, benzene, xylene, kerosene, and liquid paraffin, with aliphatic hydrocarbons being the most preferred.

W/O emulsifying agents which can be used for formation of W/O emulsions (in addition to the surface active agent system for inversion) are not particularly limited, and emulsifying surface active agents commonly employed in W/O emulsions can be used. In this regard, the W/O emulsion of the present invention may be made by mixing a W/O emulsion comprising the continuous and discontinuous phases mentioned above, with the novel surface active agent system for inversion as defined herein. Thus, in this case, the emulsifying agents discussed immediately hereafter are used to prepare the W/O emulsion which is subsequently mixed with the novel surface active agent system. Preferred emulsifying agents are those having a hydrophilic-lipophilic balance (HLB) of from 1 to 10, and more preferably from 2 to 6. Specific examples of these emulsifying agents are sorbitan monooleate, sorbitan monostearate, polyoxyethylene sorbitan monooleate, polyoxyethylene oleyl ether, polyoxyethylene nonylphenyl ether, glycerol monostearate, and mixtures thereof.

The W/O emulsion of the water-soluble cationic polymer according to the present invention contains a novel surface active agent system for inversion. The surface active agent system for inversion comprises a mixture of at least one alkyl phosphate represented by formula (I) or (II) described above, and at least one other surface active agent compatible with the alkyl phosphate.

Examples of suitable alkyl phosphates include salts of polyoxyethylene monostearyl phosphate, polyoxyethylene monooleyl phosphate, polyoxyethylene distearyl phosphate, polyoxyethylene dioleyl phosphate, polyoxyethylene nonylphenyl ether monophosphate and polyoxyethylene nonylphenyl ether diphosphate. Specific examples are polyoxyethylene (n=3) monostearyl phosphate sodium salt, and polyoxyethylene (n=2) monooleyl phosphate potassium salt.

Such "other" water-soluble surface active agents which are compatible with the above-described alkyl phosphates include alkylarylsulfonic acid salts, dialkylsulfosuccinic acid salts, condensates of higher alcohols and ethylene oxide, condensates of alkylphenols and ethylene oxide, condensates of higher fatty acid sorbitan esters and ethylene oxide, longchain fatty acid polyethylene glycol esters, and partial esters of polyhydric alcohols and higher fatty acids. Specific examples are anionic surface active agents, e.g., alkali metal salts of alkylarylsulfonic acids, sodium dialkylsulfosuccinates; and nonionic surface active agents, e.g., a reaction product of lauryl alcohol and 10 ethylene oxide units, a reaction product of nonylphenol and 12 ethylene oxide units, tetraethylene glycol monostearate, sorbitan tristearate, and a reaction product of sorbitan monostearate and 12 ethylene oxide units.

In the W/O emulsion according to the present invention, an aqueous (discontinuous) phase containing the water-soluble cationic polymer, and the surface active agent system for inversion form colloidal particles or droplets dispersed in an oily (continuous) phase comprising a hydrophobic liquid and a W/O emulsifying agent. The proportion of the aqueous phase in the emulsion preferably ranges from about 50 to 90% by weight, and more preferably from 55 to 85% by weight based on the total weight of the emulsion.

The amount of the polymer in the emulsion preferably ranges from about 15 to 80% by weight, and more preferably from 20 to 70% by weight, based on the total weight of the emulsion.

The amount of the W/O emulsifying agent for obtaining a stable emulsion is preferably in the range of from about 1.0 to 20.0% by weight, and more preferably from 2.0 to 15.0% by weight, based on the total hydrophobic liquid.

The amount of the surface active agent system for inversion is from about 0.3 to 5% by weight, and preferably from 0.5 to 4% by weight, based on the total weight of the emulsion, with the proportion of alkyl phosphate to compatible surface active agent ranging from 3/97 to 50/50, and preferably from 5/95 to 40/60, by weight.

The emulsion of the present invention can be obtained by emulsifying and dispersing an aqueous solution of a monomer(s) in a hydrophobic liquid containing a W/O emulsifying agent and polymerizing the monomer(s) in the presence of a free radical-forming polymerization initiator.

Examples of usable polymerization initiators include redox initiators comprising a combination of a peroxide, e.g., a persulfate and an alkyl peroxide, and a reducing agent, e.g., a ferrous salt and an amine compound; and azo type pyrolysis initiators, e.g., azobisisobutyronitrile, 2,2'-azobis(2- amidinopropane) hydrochloride, and 4,4'-azobis (4-cyanovaleric acid). Polymerization may also be induced by light irradiation in the presence of a photosensitizer, e.g., benzophenone and benzoin methyl ether.

These polymerization initiator and photosensitizer are respectively used in an amount usually ranging from about 10 to 5000 ppm, and preferably from 30 to 3000 ppm, based on the monomer(s). If desired, the system of reversed phase emulsion polymerization may further contain, in addition to the above-mentioned components, chain transfer agents, other surface active agents for inversion, chelating agents, buffering agents, salts, and the like.

The surface active agent system for inversion of the present invention is generally added to the emulsion after polymerization, but may be added before polymerization.

The W/O emulsion of a water-soluble cationic polymer which contains a novel surface active agent system for inversion according to the present invention can be rapidly inverted in water, whereby the polymer is released in an aqueous medium in the form of a solution to easily provide an aqueous polymer solution. Thus, the working efficiency is considerably improved. The surface active agent system according to the present invention is effective on cationic polymers but ineffective on nonionic or anionic polymers.

The present invention is now illustrated in greater detail with reference to Examples, but it should be understood that the present invention is not deemed to be limited thereto. In the examples, all the parts and percents are given by weight unless otherwise indicated.

EXAMPLES 1 TO 3 AND COMPARATIVE EXAMPLES 1 AND 2

1) Preparation of Emulsion 112.0 g of a 50% aqueous solution of acrylamide and 70.0 g of a 80% aqueous solution of methacryloyloxyethyltrimethylammonium chloride (hereinafter referred to as METAC), were added to 86.0 g of $H_2O$ to prepare an aqueous phase. The aqueous phase was added to an oily phase comprising 120.0 g of a liquid aliphatic hydrocarbon ("Isozol-300" produced by Nisseki Kagaku), 4.0 g of glycerol monostearate ("Leodor MS-60" produced by Kao; HLB: 3.5), and 8.0 g of sorbitan monooleate ("Leodor SP-010" produced by Kao; HLB: 4.8), and the mixture was stirred in a Waring blender for 1 minute to obtain a W/O emulsion. The resulting W/O emulsion was charged in a 500 cc separable flask equipped with a stirrer, an inlet for introducing nitrogen, a thermometer, a water bath, and a gas outlet. After purging oxygen from the flask by blowing nitrogen for 60 minutes, the emulsion was kept at 50° C., and 2,2,-azobis-2,4-dimethylvaleronitrile (0.05 mg in 1 ml of toluene) as a polymerization initiator was added thereto The system was allowed to polymerize until the residual monomer was reduced to 1% or less.

A reaction product of nonylphenol and 12 ethylene oxide units (hereinafter referred to as NP-12EO) and polyoxyethylene (n=3) monostearyl phosphate sodium salt or polyoxyethylene (n=2) oleyl phosphate potassium salt in amounts shown in Table 1 below were slowly added to the resulting W/O emulsion to prepare a W/O emulsion of a water-soluble cationic polymer.

For comparison, a comparative W/O emulsion was prepared in the same manner as described above, except no alkyl phosphate was added.

The polymer had a viscosity of 420 cp as measured in a 1% solution in a $\frac{1}{4}$N sodium chloride aqueous solution with a Brookfield viscometer "Model BL" manufactured by Tokyo Keiki Co., Ltd.

2) Inversion Test of Emulsion

In a 500 ml glass-made beaker, 494.6 g of ion-exchanged water was placed, and 5.4 g of each of the above-prepared emulsions was added thereto under stirring at 240 rpm. Measurements of Brookfield viscosity were made with time as a variable until a constant value was read out. A ratio of the measured value (A) for each measurement to the constant measured value (Ao) was taken as a ratio of inversion rate [ratio of inversion rate A/Ao×100 (%)]. The rate of inversion was evaluated by the time required for the ratio of inversion rate to get close to 100. The results obtained are shown in Table 1 below. It is apparent from Table 1 that the emulsions according to the present invention have markedly high rate of inversion.

phase was prepared by adding 179.2 g of a 50% aqueous solution of acrylamide and 74.7 g of a 30% sodium acrylate aqueous solution to 14.3 g of water. The resulting polymer had a viscosity of 3500 cp as measured under the same conditions as in Example 1.

The emulsion was subjected to the same inversion test as in Example 1, except that 498.2 g of ion-exchanged water was placed in a 500 ml glass-made beaker and 1.8 g of the emulsion, to which a prescribed amount of a surface active agent for inversion was added as shown in Table 2 below, was added thereto. The results obtained are shown in Table 2. It can be seen from the results of Table 2 that, unlike the examples which use cationic polymers as in Examples 1 to 3, improvement in inversion rate by the addition of the alkyl phosphate was not observed.

COMPARATIVE EXAMPLE 4

A W/O emulsion of a nonionic polymer containing a surface active agent for inversion was prepared in the same manner as in Example 1, except that the aqueous phase was prepared by adding 224.0 g of a 50% aqueous solution of acrylamide to 44.0 g of water. The resulting polymer had a viscosity of 1100 cp as measured under the same conditions as in Example 1.

The emulsion was subjected to the same inversion test as in Example 1, except that 489.6 g of ion-exchanged water was put in a 500 ml glass-made beaker, and 10.4 g of the emulsion, to which a prescribed amount of a surface active agent for inversion was added as shown in Table 3 below, was added thereto. The results obtained are shown in Table 3. It can be

TABLE 1

| | Surface Active Agent for Inversion | | | | | | |
|---|---|---|---|---|---|---|---|
| | Alkyl Phosphate/ | | Ratio of Inversion Rate (%) Time After Start of Dissolving | | | | |
| Example No. | Compatible Surface Active Agent | Amount (%) | 1 min | 3 min | 5 min | 10 min | 20 min |
| Example 1 | (a)/(c) = 10/90 | 2.5 | 70 | 90 | 100 | 100 | 100 |
| Example 2 | (b)/(c) = 20/80 | 2.5 | 60 | 85 | 95 | 100 | 100 |
| Example 3 | (a)/(c) = 30/70 | 1.8 | 55 | 80 | 90 | 95 | 100 |
| Comparative Example 1 | —/(c) = 0/100 | 2.5 | 15 | 25 | 40 | 75 | 90 |
| Comparative Example 2 | —/(c) = 0/100 | 1.8 | 10 | 20 | 35 | 60 | 85 |

Note:
(a): Polyoxyethylene (n = 3) monostearyl phosphate Na salt
(b): Polyoxyethylene (n = 2) oleyl phosphate K salt
(c): Reaction product of nonylphenol and 12 ethylene oxide units (NP-12EO)
(hereinafter the same)

COMPARATIVE EXAMPLE 3

A W/O emulsion of an anionic polymer containing a surface active agent for inversion was prepared in the same manner as in Example 1, except that the aqueous seen from the results in Table 3 that, unlike the examples which used cationic polymers as in Examples 1 to 3, improvement in inversion rate by the addition of the alkyl phosphate was not observed.

TABLE 2

| | Surface Active Agent for Inversion | | | | | | |
|---|---|---|---|---|---|---|---|
| | Alkyl Phosphate/ | | Ratio of Inversion Rate (%) Time After Start of Dissolving | | | | |
| Example No. | Compatible Surface Active Agent | Amount (%) | 1 min | 3 min | 5 min | 10 min | 20 min |
| Comparative Example 3-1 | —/(c) = 0/100 | 2.5 | 30 | 70 | 90 | 100 | 100 |
| Comparative Example 3-2 | (a)/(c) = 10/90 | 2.5 | 28 | 66 | 88 | 95 | 100 |

TABLE 3

| Example No. | Surface Active Agent for Inversion Alkyl Phosphate/ Compatible Surface Active Agent | Amount (%) | Ratio of Inversion Rate (%) Time After Start of Dissolving | | | | |
|---|---|---|---|---|---|---|---|
| | | | 1 min | 3 min | 5 min | 10 min | 20 min |
| Comparative Example 4-1 | —/(c) = 0/100 | 2.5 | 25 | 55 | 75 | 90 | 100 |
| Comparative Example 4-2 | (a)/(c) = 10/90 | 2.5 | 25 | 50 | 70 | 90 | 100 |

While the invention has been described in detail and with reference to specific examples thereof, it will be apparent to one skilled in the art that various changes and modifications can be made therein without departing from the spirit and scope thereof.

What is claimed is:

1. A water-in-oil emulsion of a cationic polymer suitable for inversion, comprising a continuous phase comprising a hydrophobic liquid, a discontinuous phase comprising a water-soluble cationic polymer, and a surface active agent system for inverting said emulsion in water, said system comprising a mixture of at least one alkyl phosphate represented by formula (I) or (II) and at least one other surface active agent compatible with said at least one alkyl phosphate:

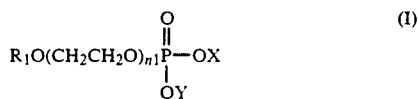
(I)

wherein $R_1$ represents a saturated or unsaturated hydrocarbon group having from 8 to 18 carbon atoms; X and Y, which may be the same or different, each represents a hydrogen atom, an alkali metal, an ammonium group, or an alkanolamino group; and n1 represents 0 or an integer of from 1 to 4;

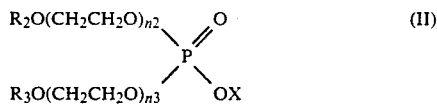
(II)

wherein $R_2$ and $R_3$, which may be the same or different, each represents a saturated or unsaturated hydrocarbon group having from 8 to 18 carbon atoms; X represents a hydrogen atom, an alkali metal, an ammonium group, or an alkanolamino group; and n2 and n3 each represents 0 or an integer of from 1 to 4.

2. A water-in-oil emulsion as claimed in claim 1, wherein said alkyl phosphate represented by formula (I) or (II) is selected from polyoxyethylene monostearyl phosphate, polyoxyethylene monooleyl phosphate, polyoxyethylene distearyl phosphate, polyoxyethylene dioleyl phosphate salts, polyoxyethylene nonylphenyl ether monophosphate, and polyoxyethylene nonylphenyl ether diphosphate salts.

3. A water-in-oil emulsion as claimed in claim 1, wherein said compatible water-soluble surface active agent is selected from alkylarylsulfonic acid salts, dialkylsulfosuccinic acid salts, condensates of higher alcohols and ethylene oxide, condensates of alkylphenols and ethylene oxide, condensates of higher fatty acid sorbitan esters and ethylene oxide, long-chain fatty acid polyethylene glycol esters, and partial esters of polyhydric alcohols and higher fatty acids.

4. A water-in-oil emulsion as claimed in claim 1, wherein said surface active agent system for inversion is present in an amount of from about 0.3 to 5% by weight based on the total weight of the emulsion, with the ratio of the alkyl phosphate to the compatible water-soluble surface active agent being from 3/97 to 50/50 by weight.

5. A water-in-oil emulsion as claimed in claim 1, wherein said water-soluble cationic polymer is a homopolymer of cationic monomers selected from the group consisting of dimethylaminoethyl (meth)acrylate, diethylaminoethyl (meth)acrylate, dimethylaminopropyl (meth)acrylate, dimethylaminohydroxypropyl (meth)acrylate, and dimethylaminoethyl acrylamide as well as quaternary ammonium salts thereof, and vinylpyridine.

6. A water-in-oil emulsion as claimed in claim 5, wherein said water-soluble cationic polymer is a copolymer of said cationic monomers and acrylamide or other vinyl monomers.

7. A water-in-oil emulsion as claimed in claim 1, wherein said cationic polymer has a molecular weight above several tens of thousands up to about 20,000,000.

8. A water-in-oil emulsion as claimed in claim 1, wherein said hydrophobic liquid is a liquid hydrocarbon or substituted liquid hydrocarbon.

9. A water-in-oil emulsion as claimed in claim 8, wherein the hydrophobic liquid is selected from halogenated hydrocarbons, aromatic hydrocarbons, or aliphatic hydrocarbons.

10. A water-in-oil emulsion as claimed in claim 9, wherein the halogenated hydrocarbon is perchloroethylene.

11. A water-in-oil emulsion as claimed in claim 8, wherein the aliphatic or aromatic hydrocarbon is selected from the group consisting of benzene, xylene, kerosene, and liquid paraffin.

12. A water-in-oil emulsion as claimed in claim 1, wherein said continuous phase further comprises emulsifying active agent having a hydrophilic-lipophilic balance (HLB) of from 1 to 10.

13. A water-in-oil emulsion as claimed in claim 12, wherein the HLB is from 2 to 6.

14. A water-in-oil emulsion as claimed in claim 12, wherein the emulsifying surface active agent is selected from the group consisting of sorbitan monooleate, sorbitan monostearate, polyoxyethylene sorbitan monooleate, polyoxyethylene oleyl ether, polyoxyethylene nonylphenyl ether, glycerol monostearate and mixtures thereof.

15. A water-in-oil emulsion as claimed in claim 2, wherein said alkyl phosphate is selected from the group consisting of polyoxyethylene (n=3) monostearyl phosphate sodium salt and polyoxyethylene (n=2) monooleyl phosphate potassium salt.

16. A water-in-oil emulsion as claimed in claim 1, wherein the proportion of the discontinuous phase in the emulsion ranges from about 50 to 90% by weight.

17. A water-in-oil emulsion as claimed in claim 1, wherein the amount of the polymer in the emulsion ranges from about 15 to 80% by weight.

18. A water-in-oil emulsion as claimed in claim 4, wherein said surface active agent system for inversion is present in an amount of from 0.5 to 4% by weight.

19. A water-in-oil emulsion as claimed in claim 4, wherein the ratio of the alkyl phosphate to the compatible water-soluble surface active agent is from 5/95 to 40/60 by weight.

* * * * *